March 5, 1963

P. M. MINDER 3,080,506

CAPACITOR BANK PROTECTIVE ARRANGEMENT

Filed March 23, 1960

INVENTOR.
PETER M. MINDER
BY Lee H. Kaiser
ATTORNEY.

March 5, 1963
P. M. MINDER
3,080,506
CAPACITOR BANK PROTECTIVE ARRANGEMENT
Filed March 23, 1960
2 Sheets-Sheet 2
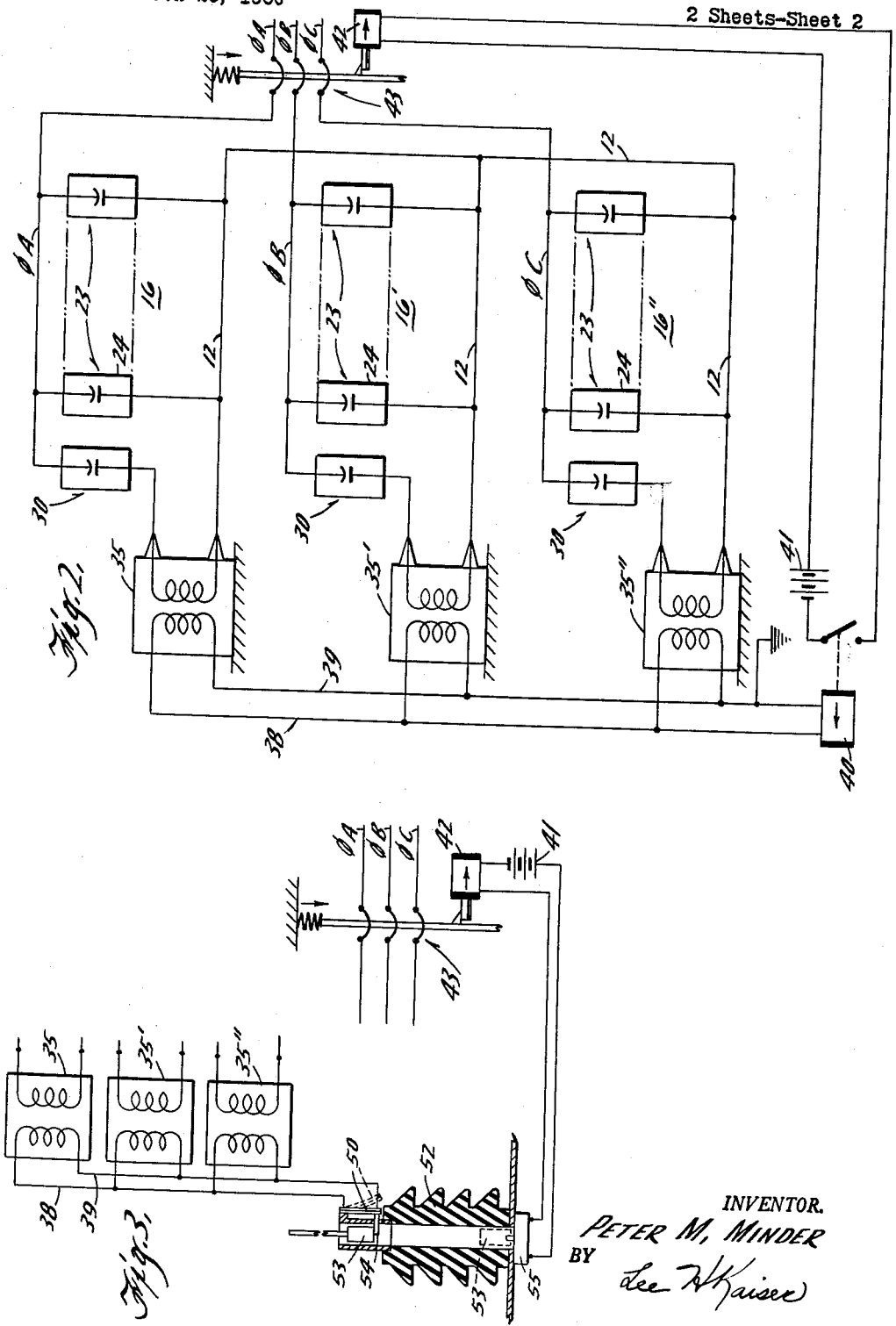
INVENTOR.
PETER M. MINDER
BY
Lee W. Kaiser
ATTORNEY.

United States Patent Office 3,080,506
Patented Mar. 5, 1963

3,080,506
CAPACITOR BANK PROTECTIVE ARRANGEMENT
Peter M. Minder, Basel, Switzerland, assignor to McGraw-Edison Company, Milwaukee, Wis., a corporation of Delaware
Filed Mar. 23, 1960, Ser. No. 17,034
5 Claims. (Cl. 317—12)

This invention relates to power capacitors for supplying reactive volt amperes to alternating current power systems and in particular to arrangements for protecting capacitor banks connected in shunt to alternating current power systems.

Star connected, floating neutral capacitor banks are conventionally protected by dividing the bank into two halves and connecting a potential transformer or a current transformer in the neutral between the halves to detect unbalance and to operate a relay in response to said unbalance to trip the circuit breaker and thus de-energize the bank. Although this split-neutral arrangement is suitable for most open rack capacitor banks and for a housed capacitor bank of two cubicles, it is impracticable in single cubicle housings and open type banks where it is impossible to physically separate the bank into two halves. For example, it is impossible to utilize the conventional split-neutral arrangement for protecting 900 and 1800 kilovar housed capacitor banks. In the conventional protective arrangement suitable for single cubicle capacitor banks (often referred to as the wye-broken-delta potential transformer arrangement), potential transformers are connected line-to-neutral and a relay is connected across the broken delta of the transformer secondaries. A predetermined unbalance in the bank causes current to flow through the relay and trip the oil circuit breaker to de-energize the bank. An inherent disadvantage of this arrangement is the high cost of the potential transformers which must have insulation of the phase-to-phase voltage class.

It is an object of the invention to provide improved protective means for capacitor banks that cannot be split into two halves which is as sensitive as the split-neutral arrangement but costs substantially less than prior art protective schemes.

It is a further object of the invention to provide such an improved capacitor bank protective arrangement which obviates the necessity of expensive potential transformers.

Other objects and advantages of the invention will be apparent from the following detailed description when taken in conjunction with the accompanying drawing wherein:

FIG. 2 is a schematic circuit diagram of an alternative arrangement for mounting and connecting the current transformers; and FIG. 3 is a schematic, partial view of an alternative embodiment of the invention.

Figure 1:
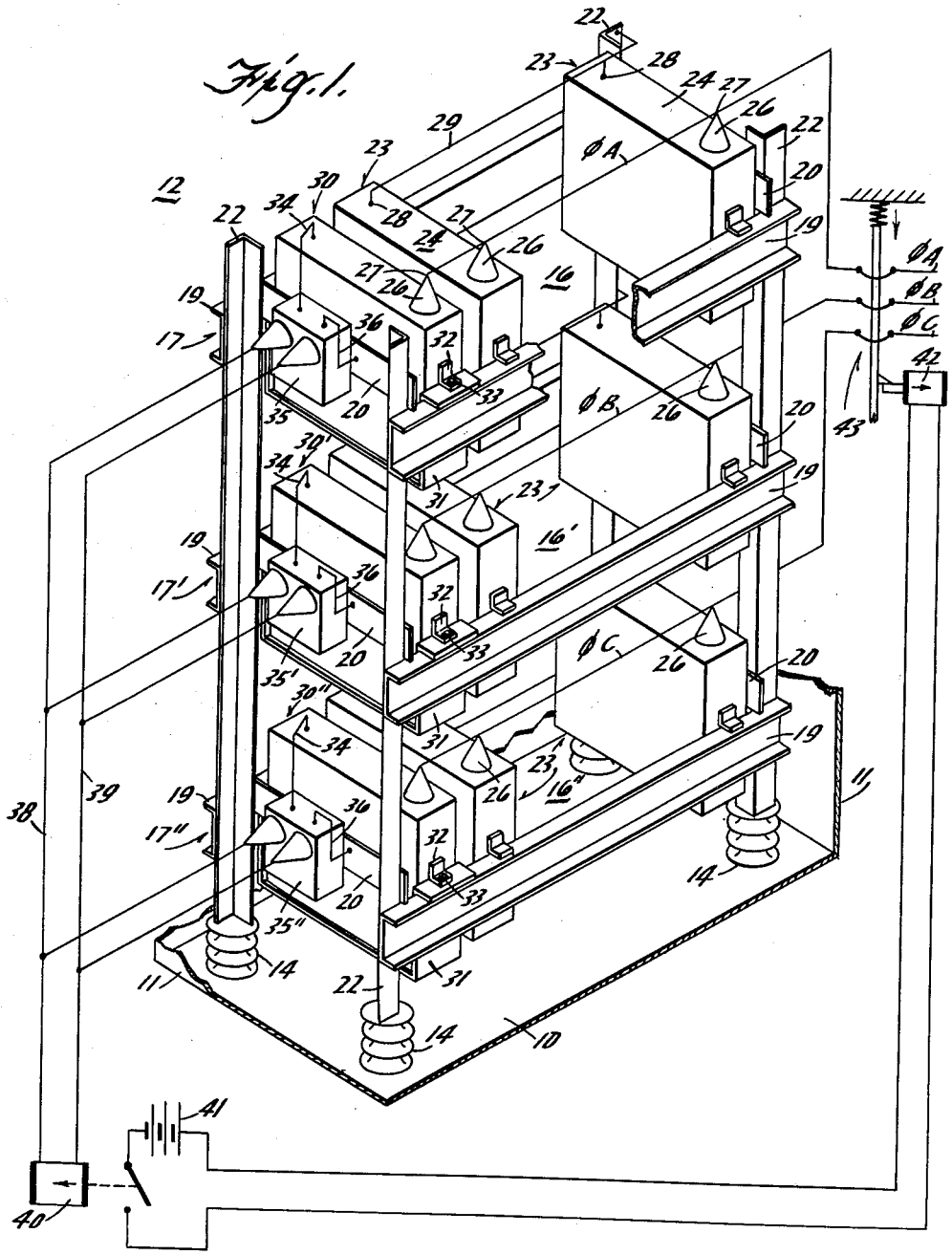
FIG. 1 is a schematic diagram of the capacitor units and rack therefor of a housed capacitor bank connected in accordance with a preferred embodiment of the invention.

The protective means of the invention is particularly adapted to protect floating-wye, single series group, capacitor banks of the housed type which cannot be split into two halves and where the split neutral arrangement is impractical. In FIG. 1 only the bottom housing wall 10 and portions of the side walls 11 of a capacitor compartment, or housing, is illustrated. An inner steel frame rack 12 insulated by porcelain spacing insulators 14 from ground and from the capacitor compartment, or housing, supports three groups 16, 16' and 16" of paralleled capacitors each of which is connected to one of the phases of a polyphase power system. The metallic rack 12 thus insulated from ground constitutes the floating neutral of the three phase, wye connected capacitor bank and comprises three steel frame tiers, or blocks 17, 17' and 17" mounted on above the other. Each block 17 has a pair of parallel, spaced apart, horizontally disposed, angle iron support members 19 and a pair of parallel, spaced apart, horizontally disposed transverse angle iron members 20 adjacent the ends of support members 19. Vertical, angle iron corner posts 22 welded to the horizontal members 19 and transverse members 20 support the steel frame tiers, or blocks 17, 17' and 17" in spaced apart relation and electrically interconnect the steel frame blocks 17, 17' and 17" of the rack 12 which constitutes the floating neutral.

The capacitor units 23 of each group 16, 16' and 16" are connected in parallel and preferably individually fused, and the paralleled capacitors of the groups 16, 16' and 16" are respectively connected between the phase buses $\phi A$, $\phi B$, and $\phi C$ of a polyphase alternating current power system and the floating neutral formed by rack 12. The steel frame blocks 17, 17' and 17" support the capacitor units of the paralleled groups 16, 16' and 16" respectively. The groups 16, 16' and 16" as well as the blocks 17, 17' and 17" are substantially identical and only group 16 mounted on block 17 associated with phase A will be described. The prime (') and double prime (") designations connote the corresponding parts associated with phases B and C. Although the invention is applicable to capacitor units of the single bushing or of the double bushing type, as illustrated in FIG. 1 single bushing capacitor units 23 in group 16 have the metallic casings 24 thereof mounted on the horizontal metallic support members 19. The terminals 27 on the single bushings 26 of all of the parallel capacitor units of group 16 are connected to the phase bus $\phi A$. The tank terminals 28 of all but one of the single bushing capacitor units 23 of group 16 are electrically commoned by a copper wire 29 which is connected to the steel frame block 17.

The metal casing of one capacitor unit 30 of group 16 is isolated by suitable insulating means such as a sheet of fiberboard material 31 for relatively low voltages from the steel frame block 17, for example, for 600 volts for a 15 kilovolt power system. The mounting lugs 32 of capacitor unit 30 are affixed to the horizontal metallic support members 19 of block 17 by suitable bolts 33 constructed of insulating material. The bushing terminal 27 of said capacitor unit 30 is connected to the corresponding phase bus $\phi A$ (the fuses being omitted from the drawing), but the tank terminal 28 thereof is not connected to copper wire 29 but rather is connected by lead 34 to one secondary winding terminal of a current transformer 35 mounted on the steel frame block 17. In the embodiment of FIG. 1 the current transformer 35 has insulation of the phase-to-neutral voltage class. The other secondary winding terminal of current transformer 35 is connected by a lead 36 to the steel frame block 17. Current transformer 35 is thus in series with a single capacitor 30 of phase A and derives a current proportional to the current through capacitor 30. The primary winding terminals of the current tranformers 35, 35', and 35" of all three phases are connected in parallel by leads 38 and 39 and in series with the operating coil of a current sensitive detecting relay 40 preferably having inverse time characteristics. The leads 38 and 39 should have clearance to the steel frame rack 12 corresponding to the voltage class of the capacitor units. Relay 40, in operating, connects a source of potential 41 to the trip coil 42 of a circuit breaker 43 which is adapted to open the three phase buses $\phi A$, $\phi B$, and $\phi C$ and remove the capacitor bank from the power system.

Under normal operating conditions the currents flowing in the secondary windings of all three current transformers 35, 35' and 35" are equal in magnitude and displaced by 120 degrees so that the vectorial sum of the primary currents of the three parallel connected current transformers, and the current flowing through relay 40, is substantially zero. The three paralleled current transfomers 35, 35' and 35" vectorially add the derived currents which are proportional to the currents through the three capacitors 30, 30' and 30" in the three phases, and relay 40 operates in response to a predetermined vectorial sum of said derived currents. In the event of a failure of a capacitor unit 23 in any group 16, 16' and 16", the secondary of the current transformer in that phase is bypassed, thereby causing the vectorial sum of the transformer primary currents to be other than zero with the consequent operation of relay 40 and the tripping of circuit breaker 43 to remove the capacitor bank from the power system. If the capacitor units 23 are individually fused and a sufficient number of fuses have ruptured so that 110% of nominal voltage appears across the remaining capacitor units of a group of capacitors, the current through the current transformer secondary winding of that phase increases by 10% as it decreases in the other two phases due to shift of the neutral, and the vectorial sum of the three primary currents is sufficient to operate relay 40 and remove the capacitor bank from the power system.

The disclosed protective scheme provides sensitivity equal to that of the conventional split-neutral arrangement and at greatly reduced cost in comparison to the wye-broken-delta protective scheme having three potential transformers connected in open delta. For example, in the 15 kilovolt class the cost of a current transformer of the phase-to-neutral voltage class is only approximately one fifth of the cost of a potential transformer of the phase-to-phase voltage class.

In the alternative embodiment illustrated in the schematic circuit diagram of FIG. 2, the current transformers 35, 35' and 35" are mounted on a grounded structure rather than on the insulated steel frame rack 12, the primary bushing terminals of the current transformers 35, 35' and 35" are respectively connected to the tank terminals 28 of the capacitors 30, 30' and 30" and to the floating neutral provided by the steel frame rack 12, and the secondary windings of the current transformers are connected in parallel by leads 38 and 39 and in series with the operating winding of relay 40. In such embodiment the leads 38 and 39 need only have clearance for 600 volts to ground.

In another embodiment (not shown) the insulation of the three current transformers 35, 35' and 35" is of a low voltage class, and a single current transformer of the phase-to-neutral voltage class couples the paralleled windings of the three low voltage current transformers to the relay 40.

In the embodiment of FIG. 3 the insulation of the three current transformers 35, 35' and 35" is also of a low voltage class and the three paralleled current transformer windings are connected by leads 38 and 39 in series with a bimetal strip 50. Bimetal strip 50 is supported on a porcelain insulator 52 of the phase-to-neutral voltage class. A switch operating cylinder 53 is normally held by a laterally extending arm 54 on bimetal strip 50 in an elevated position relative to a switch 55 which is adapted, when operated, to connect the source of potential 41 to the trip coil 42 of the circuit breaker 43 and thus remove the capacitor bank from the power system. Cylinder 53 is adapted, when released upon sufficient flexing of bimetal strip 50, to fall through the axial bore in porcelain insulator 52 and actuate switch 55. It will be apparent that bimetal strip 50 is responsive to the heating caused by a predetermined vectorial sum of the paralleled transformer winding currents to move arm 54 from beneath its supporting position relative to cylinder 53 and thus release cylinder 53 and permit it to actuate switch 55. The porcelain insulator 52 isolates the floating neutral of the capacitor bank from the switch 55 which connects the source of potential 41 to the trip coil 42 of the circuit breaker 43.

While only a few embodiments of the invention have been illustrated and described, many modifications and variations thereof will be apparent to those skilled in the art, and consequently, it is intended in the appended claims to cover all such modifications and variations which fall within the true spirit and scope of the invention.

What I claim as new and desire to secure by Letters Patent of the United States is:

1. In combination with a polyphase alternating current power system, a polyphase bank of capacitors, a circuit breaker for switching said bank on to and off said power system, said bank comprising a plurality of two-terminal, single bushing, encased capacitor units, a metallic rack, means for isolating said rack from ground, the casings of said capacitor units being supported on said rack, the bushing terminal of all of the capacitor units associated with each of said phases being connected to said phase of said power system, means for insulating the casing of one capacitor of each phase from said rack, the other terminal of all of the remaining capacitor units associated with each said phase being connected to said rack, and protective means for detecting failure of a capacitor in any of said phases, said protective means having insulation of the phase-to-neutral voltage class and including a current transformer in each phase in series with said one capacitor of said phase for deriving a current proportional to the current through said one capacitor, the output windings of said current transformers of all of said phases being connected in parallel to simultaneously vectorially add said derived currents, and means responsive to a predetermined sum of said derived currents for actuating said circuit breaker to disconnect said capacitor bank from said power system.

2. In combination with a three phase alternating current power system, a three phase capacitor bank, a circuit breaker for switching said bank on to and for disconnecting it from said system, said capacitor bank comprising a plurality of two-terminal encased capacitor units, a metallic rack, means for isolating said rack from ground, the casings of said capacitor units being supported on said rack, one terminal of the capacitor units of each phase being connected to the corresponding phase of said power system and the other terminal of all but one of said power system and the other terminal of all but one capacitor unit of said phase being connected to said rack and constituting said rack the floating neutral of said bank, means for protecting said capacitor bank including a current transformer in each phase mounted on said rack and connected between the other terminal of said one capacitor and said rack for deriving a current proportional to the curernt through said one capacitor of said phase, said protecting means having insulation of the phase-to-neutral voltage class, the output windings of said current transformers of all of said phases being connected in parallel to vectorially add said derived currents, and means responsive to a predetermined sum of said derived currents for actuating said circuit breaker to disconnect said bank from said power system.

3. In a polyphase alternating current electrical power system, in combination, a Y-connected capacitor bank, a metallic rack, means for insulating said rack from ground, the capacitors of said bank being supported on said rack and being divided into a plurality of groups each of which is associated with one of the phases of said power system, the capacitors of each group being connected in parallel between the corresponding phase of said power system and said rack and constituting said rack the floating neutral of said capacitor bank, and means for protecting said capacitor bank including a plurality of current transformers one of which is associated with each said group and is connected between said rack and a single capacitor of said group, said protecting means having insulation of the phase-to-neutral voltage class and including a current sensitive element, the output windings of said current transformers being connected in parallel and said paralleld windings being connected in series with said current sensitive element.

4. In a polyphase alternating current power system, in combination, a metallic rack, a polyphase bank of capacitors connected in star to said system and comprising a plurality of encased capacitor units supported on said rack, means for isolating said rack from ground, the capacitor units of each phase being connected between the corresponding phase of said power system and said rack to constitute said rack the floating neutral of said bank, means of the phase-to-neutral insulation class for protecting said bank including a current transformer in each phase of said bank in series with one capacitor unit in said phase for deriving a current proportional to the current through said one capacitor unit of said phase, the output windings of said current transformers being connected in parallel to vectorially add said derived currents, and means responsive to a predetermined sum of said derived currents for disconnecting said capacitor bank from said power system.

5. In a three phase alternating current power system, in combination, a metallic rack, a capacitor bank comprising a plurality of capacitor units having metallic casings mounted on said rack, each said casing having a single insulating bushing thereon and one electrode of said capacitor being connected to said bushing and the other electrode being connected to said casing, said bank being divided into three groups of capacitors each of which is associated with one of the phases of said power system, means for insulating said rack from ground, said bushings of the capacitor units of each said group being connected to the corresponding phase of said power system and said metallic rack constituting the floating neutral of said bank, a plurality of current transformers having insulation of a class lower than the phase-to-phase voltage of said power system and each having a primary and a secondary winding, one of said current transformers being associated with each said group and having one of its windings connected between said rack and said bushing on a single capacitor unit of said group, the other winding of all of said current transformers being connected in parallel, means for insulating said metallic casing of said single capacitor unit of each phase from said rack, and a current sensitive detecting device connected in series with said paralleled other windings of said current transformers.

References Cited in the file of this patent
UNITED STATES PATENTS

| | | |
|---|---|---|
| 2,794,154 | Minder | May 28, 1957 |
| 2,888,613 | Cuttino | May 26, 1959 |